United States Patent [19]
Dickinson

[11] 3,771,985
[45] Nov. 13, 1973

[54] MANUFACTURE OF FLOAT GLASS
[75] Inventor: George Alfred Dickinson, Lancashire, England
[73] Assignee: Pilkington Brothers Limited, Liverpool, England
[22] Filed: May 26, 1971
[21] Appl. No.: 147,136

[52] U.S. Cl. ............................... 65/99 A, 65/182 R
[51] Int. Cl. ........................................... C03b 18/02
[58] Field of Search .............. 65/99 A, 65 A, 182 R

[56] References Cited
UNITED STATES PATENTS
| | | | |
|---|---|---|---|
| 3,083,551 | 4/1963 | Pilkington | 65/99 A |
| 3,479,171 | 11/1969 | Robinson et al. | 65/99 A |
| 3,481,729 | 12/1969 | Alonzo et al. | 65/99 A |
| 3,467,512 | 9/1969 | Loukes et al. | 65/99 A |
| 3,520,672 | 7/1970 | Greenler | 65/99 A |

FOREIGN PATENTS OR APPLICATIONS
733,906   5/1966   Canada.............................. 65/99 A Primary Examiner—S. Leon Bashore
Assistant Examiner—Kenneth M. Schor
Attorney—Burns, Doane, Swecker & Mathis

[57] ABSTRACT

Thin float glass, e.g. in the range 3 mm to 1.5 mm, is manufactured by forming a ribbon of float glass and attenuating the ribbon by applied tractive effort. Distortion in the eventual ribbon is avoided when operating at high load by creating thermal homogeneity in the molten metal of the bath supporting the ribbon in the region of attenuation and where its viscosity is in the range $10^{5.25}$ to $10^{6.75}$ poises.

10 Claims, 6 Drawing Figures

MANUFACTURE OF FLOAT GLASS

BACKGROUND OF THE INVENTION

1. Field of the Invention

This invention relates to the float process for the manufacture of flat glass, and more especially to the mnaufacture of thin float glass, for example of thickness in the range 3 mm to 1.5 mm.

Variation of the thickess of the ribbon of glass produced by the float process depends, among other factors, on the tractive effort applied to the glass, usually by the driven rollers which convey the glass away from the outlet end of the tank structure which contains the bath of molten metal along which the glass is advanced. This tractive effort and the temperature regime to which the glass is subjected, as well as the throughput of the process, usually expressed in terms of tons per week, contribute to determination of the dimensions of the ribbon of glass produced.

In order to thin the glass its termperature is regulated as it is advanced to ensure that for a time during its advance the glass is at a viscosity such that it can be attenuated, the glass at that viscosity accelerating under the action of the tractive effort as it is thinned.

2. Description of the Prior Art

In one method of producing float glass down to about 3 mm thickness, reaction to the accelerating tractive effort is provided by cooling the riboon of glass as it advances from the hot end of the bath where the ribbon of glass is formed by unhindered lateral flow of molten glass on the bath of molten metal, the cooling being effective to increase the viscosity of the glass so that the stiffened ribbon can be gripped by edge rolls. The gripped stiffened ribbon provides a reaction to the tractive effort which is stretching the glass when the stiffened ribbon has been reheated to a viscosity at which the applied tractive effort is effective to thin the glass.

In another method for producing thin float glass which can be employed for the manufacture of glass down to 1.5 mm thickness, and below, molten glass is delivered to the bath at a high mass flow rate, and the thin ribbon of glass produced is discharged from the bath at high speed. The advancing ribbon of glass is subjected to a temperature regime which maintains the glass in a deformable state over a longitudinally extending region of the ribbon in which the glass is attenuated as its velocity increases to the high final velocity. Transversely and longitudinally directed forces are applied to the margins of the nascent ribbon to regulate the speed of advance of the nascent ribbon and thereby control interfacial forces between the glass and the bath, which forces provide progressively changing reaction to the tractive effort as the glass accelerates. Thereafter the glass is subjected to said temperature regime and is accelerated to a final velocity which controls the magnitude of interfacial forces between the bath and the glass as the ribbon is being attenuated, which interfacial forces augment the marginally applied forces in engendering a distribution of reaction to the attenuating tractive force to regulate the progressive attenuation of the glass to the desired thickness.

In order to produce thin float glass for example down to 1.5 mm thick, and particularly 2 mm thick, high acceleration of the glass is necessary as the glass is being attenuated. The velocity of the glass may increase by three times or more during the attenuation of the ribbon. At the high speeds of passage of the ribbon down the bath, for example up to 40 metres per minute, entrainment of surface molten metal of the bath by the ribbon results in a pumping effect towards the cooler outlet end of the bath which forces cool molten metal upstream along the bottom and sides of the bath towards the region where the glass is being attenuated and is at a viscosity such that it is particularly susceptible to retaining in the ultimate ribbon any distortion produced in the underface of the ribbon of glass as it is attenuated.

As the glass moves to the downstream end of the zone where its thickness is finally determined, its viscosity increases at a rate such that the glass becomes so stiff as not to suffer any further dimensional variation, and any distortion produced in the glass as it is attenuated is set into the glass when the glass has reached the desired thickness.

It has been found that when producing thin float glass at high speeds flows of relatively cool molten metal tend to produce localised temperature gradients along the surface of the molten metal bath supporting the glass passing through the zone of attenuation. These temperature gradients are thought to lead to the introduction of distortion into the ribbon, especially into its underface.

It is a main object of the present invention to extend further the float process to the manufacture of thin glass with minimum of distortion in the underface of the ribbon, and producing thin float glass, for example 2 mm thick, having characteristics which make that glass entirely suitable for lamination for the manufacture of automobile windscreens.

SUMMARY

The invention relates to the manufacture of float glass, in particular thin float glass, in which glass in ribbon form is advanced along a bath of molten metal by tractive effort applied to the ribbon at the outlet end of the bath, and the glass passes along a zone of the bath in which its visocity is controlled as the glass is attenuated. Thermal homogeneity is produced in the molten metal of the bath at the glass/metal interface in a zone of the bath in which the viscosity of the glass is in the range of $10^{5.25}$ to $10^{6.75}$ poises, to minimise local temperature gradients at the glass-supporting molten metal surface in that zone, thereby reducing bottom surface distortion in the attenuated ribbon to a minimum.

DESCRIPTION OF THE PREFERRED EMBODIMENTS

Figure 1:
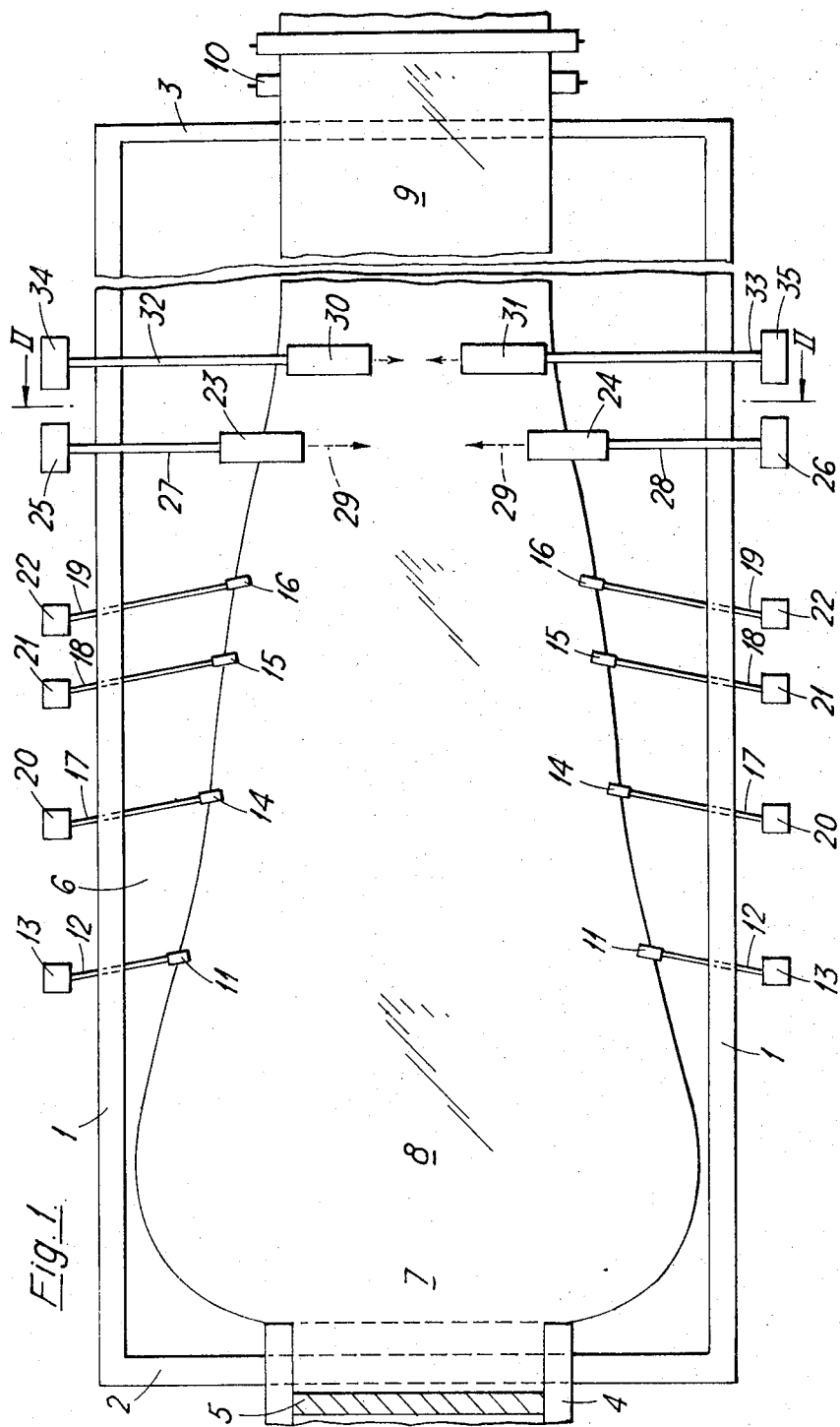
FIG. 1 is a plan view of an elongated tank structure containing a bath of molten metal for use in the float process for the manufacture of thin glass by one method according to the invention.
Figure 2:
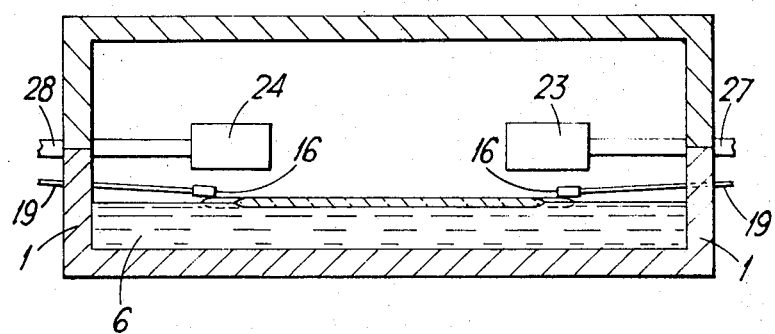
FIG. 2 is a section on line II—II of FIG. 1.

Referring to the drawings, FIGS. 1 and 2 illustrate in plan a tank structure for the manufacture of thin glass by the float process. The tank structure comprises side walls 1, an end wall 2 at the inlet end of the tank structure, and an end wall 3 at the outlet end. The geometry of the tank is such that it will accommodate the maximum possible width of ribbon of glass produced at the hot inlet end of the tank structure by the unhindered lateral flow of molten glass on the bath.

Molten soda-lime-silica glass is poured on to the bath, usually of molten tin, at the inlet end of the tank structure by a spout 4, at a controlled rate, regulated by a tweel 5, of about 1960 tons per week.

In the manner well known in the float process, temperature regulators, not shown, are provided in the molten metal bath 6 and in the roof structure over the bath. Temperature conditions at the inlet end of the bath are such that the molten glass 7 arriving on the bath is enabled to flow freely laterally unhindered to the limit of its free flow during the first part of its advance along the bath.

The temperature regulators set along the bath a temperature regime to which the advancing glass is subjected, which temperature regime maintains the glass in a deformable state over a longitudinally extending region of the ribbon in which the glass is progressively attenuated as its velocity increases under the influence of the applied tractive effort. A protective atmosphere is maintained at a plenum in the headspace over the bath.

The molten glass 7 spreads outwardly after arriving on the bath to a width of about 4.5 m. The temperature of the glass is about 990°C and its thickness about 7 mm where the maximum spread is achieved.

The layer of molten glass on the bath is advanced in ribbon form and the nascent ribbon so formed is constituted by low viscosity glass, e.g. at a viscosity of about $10^{4.8}$ poises. The glass is gradually cooled during its initial advance along the bath and its viscosity slowly increases, and as its viscosity increases the longitudinally directed tractive force, which is transmitted by the ultimate ribbon 9 of thin float glass from rollers 10 which convey that ribbon from the bath outlet, becomes more effective to stretch the ribbon. Initially while the glass is at low viscosity a pair of inclined top rolls 11 mounted on shafts 12 engaged by regulated driving motors 13 are mounted through the tank side walls 1 to engage the margins of the nascent ribbon. The top rolls 11 are knurled graphite or stainless steel or mild steel rolls, internally water-cooled and slewed at an angle of 50°.

In this region the glass temperature is about 900°C and the rolls are driven at a speed of 2.42 m/min. Outwardly and longitudinally directed forces are thereby applied to the margins of the nascent ribbon. The outward force components provide restraint against undue loss of width. Slight attenuation of the ribbon is here beginning to occur.

Further pairs of top rolls 14, 15 and 16 are provided spaced down the bath, being mounted on respective shafts 17, 18 and 19 driven by motors 20, 21 and 22.

Top rolls 14 are set at an angle of 8° and are driven at the rate of 3.33 m/min.

Top rolls 15 are set at an angle of 8° and are driven at the rate of 4.00 m/min.

Top rolls 16 are set at an angle of 10° and are driven at the rate of 4.83 m/min.

The action of these sets of top rolls avoids further undue loss of ribbon width as the glass is being accelerated from about 2.42 m/min. to 4.83 m/min. As the glass passes beyond the top rolls 16, its temperature is about 845°C, corresponding to a viscosity of $10^{5.6}$ poises, and the glass thickness is about 4.5 mm.

The ultimate ribbon 9 of 3 mm glass, 2.6 m wide, is being discharged from the bath by the rollers 10 at a speed of 9.25 m/min. and there is an acceleration of the glass and the glass is rapidly thinned to 3 mm thickness. This attenuation is taking place against the reaction provided by interfacial forces engendered between the surface of the molten metal bath and the ribbon of glass which is engaged by the top rolls 11, 14, 15 and 16.

While the glass is being attenuated it is slowly cooled to about 800°C and its viscosity rises to about $10^{6.5}$ poises. It is in this critical region where thin glass is being produced at high speed, that the glass has been found to be particularly susceptible to distortion, especially of the underface of the ribbon, by any thermal inhomogeneity in the supporting bath surface, and in order to counteract local temperature gradients in the glass-supporting molten metal surface, two long linear induction motors 23 and 24 are mounted in the tank structure over the ribbon of glass in the attenuating region where the viscosity of the glass is in the range $10^{5.25}$ to $10^{6.75}$ poises. The linear induction motors are specially cooled and encased in cast refractory material and are supplied with electric power from power supplies 25 and 26. Supply and exhaust of cooling water for the motors is also provided, the services to each motor being carried by adjustable support beams 27 and 28 which are mounted in the side walls 1 of the tank structure. As shown in FIG. 2 the bottom face of each motor is just above the glass surface.

The electric supplies to the motors 23 and 24 are phased to cause electromagnetically induced molten metal flows, indicated at 29, from the sides towards the centre of the bath. The molten metal flows 29 create mixing currents in the surface of the molten metal which thoroughly breaks up any tendency for localised circulations of molten metal to be established in the molten metal surface supporting the thinning glass. Localised temperature gradients are thereby minimised and distortion is kept to a minimum.

A second pair of linear induction motors 30 and 31 may be provided further downstream as shown to maintain thermal homogeneity in the molten metal surface supporting the glass as it reaches its final 3 mm thickness. The motors 30 and 31 are mounted on beams 32 and 33 which carry the services from supplies 34 and 35.

Figure 3:
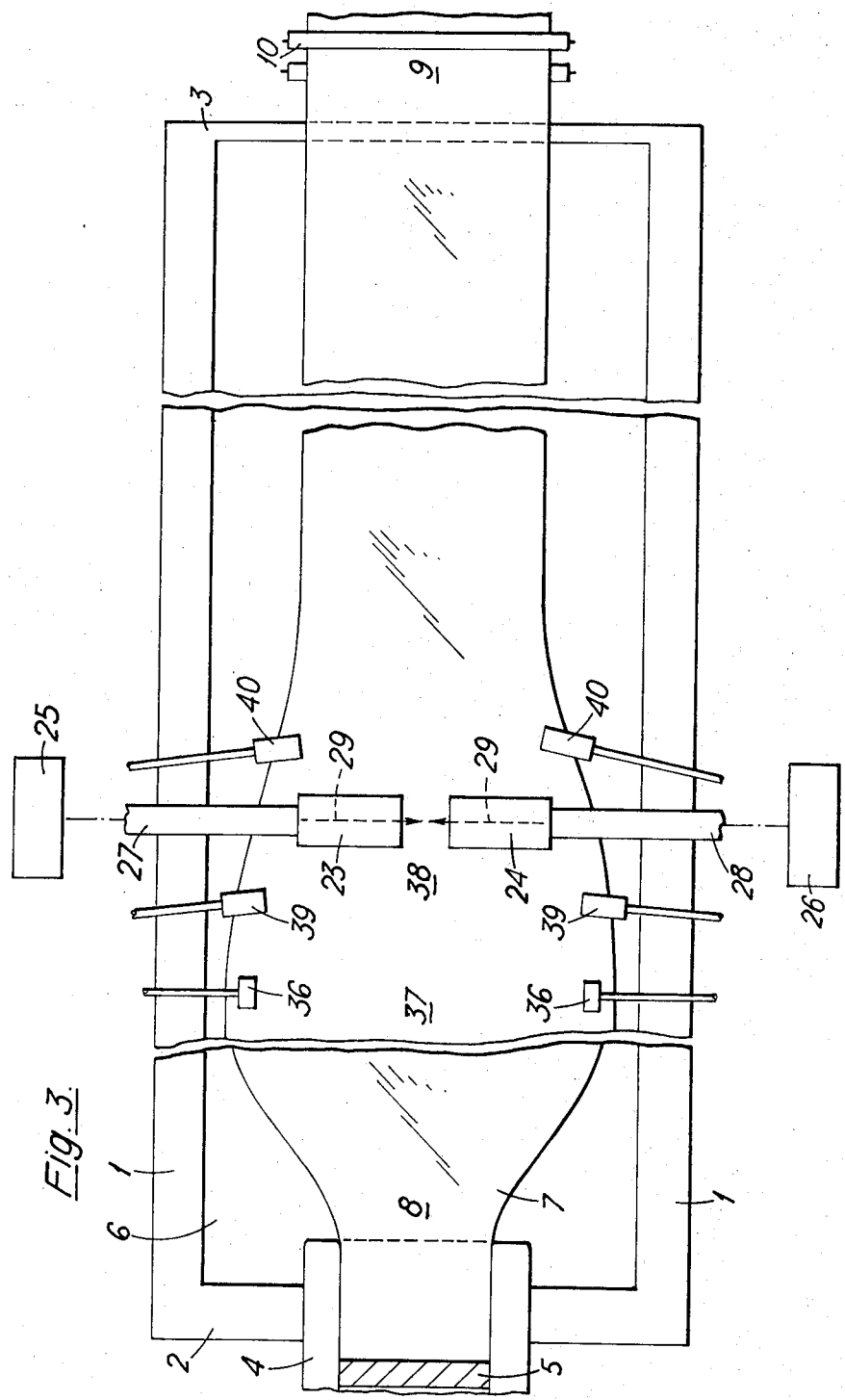
FIG. 3 is a view similar to FIG. 1 showing the application of the invention to another method of manufacturing thin float glass.

FIG. 3 illustrates another application of the invention to a method for producing 2.2 mm float glass at high load. Molten soda-lime-silica glass is poured on the bath at a rate of, for example from 1,730 to 2,600 tons per week.

In the roof structure mounted over the tank structure there are thermal regulators, as there are also in the molten metal bath 6. Thermal conditions at the inlet end of the bath are such that the molten glass 7 poured on to the bath surface from the spout, at the rate of 2,350 tonnes per week, flows laterally unhindered to produce a buoyant body of molten glass 8 to about 6.5 m wide and 7.4 mm thick, which is advancing along the bath at a rate of 1.9 m/min., under the effect of tractive effort applied to the ultimate ribbon of glass 9 produced and discharged from the bath on driven conveyor rollers 10 which apply traction to the glass.

In known manner a protective atmosphere is maintained in the headspace defined by the roof structure over the tank so as to protect the exposed surface of the molten metal of the bath 6.

The temperature of the molten glass arriving on the bath is in the region of 1,000° to 1,100°C and by the time the glass reaches the limit of its free flow it has been cooled to about 950°C and is thereafter gradually cooled as it is advanced in ribbon form along the bath until it is sufficiently stiffened to be gripped. For example the ribbon is gradually cooled to about 790°C and is then gripped marginally between apairs of edge rolls 36. The gripped stiffened region 37 of the ribbon of glass acts as an effective stiffened beam extending across the ribbon whose forward velocity is controlled by the edge rolls at for example 1.9 metres per minute. This gripped stiffened part of the ribbon provides reaction to the tractive effort applied to the ulitmate ribbon 9 and avoids transmission of that tractive effort upstream to the region 8 of the buoyant body where the glass is being permitted to flow laterally unhindered.

During its further advance the stiffened ribbon of glass is reheated to condition the glass for attenuation by applied tractive effort. In the embodiment being described the soda-lime-silica glass is reheated to a temperature of the order of 840°C but this reheat temperature may be 860°C or as high as 900°C. The temperature of the glass is maintained in this region for a short distance of the advance of the glass and the tractive effort acting on the glass is effective against the reaction provided by the gripped stiffened glass 37 to accelerate the glass from its initial speed of 1.9 metres per minute up to a speed of 14 metres per minute which is the speed of withdrawal of the ultimate ribbon of thin float glass 9 from the tank.

The glass in the region indicated at 38 in FIG. 3, is undergoing rapid acceleration. In order to help maintain the width of the glass as well as to provide a control on marginal conditions of the glass during its attenuation, inclined top rolls 39 engage the upper surface of the margins of the glass. These rolls are inclined at a shallow angle for example 7°, to an axis at right angles to the longitudinal axis of the tank, and are driven at a speed of 3.5 m/min. which is comparable with the increasing speed of the ribbon of glass. The temperature of the glass is about the tin temperature and in the embodiment being described, the tin temperature and hence the temperature of the ribbon of glass, is about 850°C in the region of the top rolls 39. Thereafter considerable acceleration takes place and in a further downstream region where the glass has reached a forward velocity of 4.5 m/min. further width control is achieved by a second set of marginal top rolls inclined at a shallow angle of 5° and engaging the top surface of the ribbon of glass. Acceleration of the glass then continues up to the ultimate speed of 14 m/min. Acceleration is still taking place as the glass enters the laterally constricted outlet end of the bath. Downstream of the top rolls 40 the glass has become so stiff that no further attenuation takes place and the ribbon 9 is 3 metres wide and 2.2 mm thick.

In order to counteract local temperature gradients existing at the glass-supporting molten metal surface just after the reheat zone 38 when the glass is passing through a viscosity range of $10^{5.25}$ to $10^{6.75}$ poises, two long linear induction motors 23 and 24 are mounted in the tank structure over the ribbon of glass. Preferably, as indicated, the motors 23 and 24 are mounted between the locations of the pairs of top rolls 39 and 40.

The linear induction motors 23 and 24 have a construction such that they extend symmetrically transversely of the bath of molten metal, being mounted on beams 27 and 28 which are fixed to the side walls 1 of the tank structure and along which services to the motors are provided from control means 25 and 26. These services are the supply and exhaust of cooling water and an electric power supply to each motor. The bottom faces of the motors are just above the glass.

As in the embodiment of FIGS. 1 and 2, the electric supply to the motors 23 and 24 is phased to cause electromagnetically induced molten metal flows, indicated at 29, across the bath in the reheat zone 38. The molten metal flowing inwardly to the center of the bath from both sides creates mixing currents in the surface of the molten metal just downstream of the reheat zone 38 which thorough mixing breaks up any tendency to the establishment of localised circulations in the surface of the molten metal supporting the glass so thereby producing thermal homogeneity in the molten metal of the bath at the glass/metal interface. This serves to minimise local temperature gradients in the molten metal surface and has been found to be effective in maintaining bottom surface distortion of the ribbon of glass to a minimum.

The effect of the linear induction motors 23 and 24 may be thought of as producing effectively a thermally uniform molten metal surface in the region where the glass is critically susceptible to deformation so that any pumping effect in this region of the rapidly accelerating glass drawing molten metal down the surface of the bath and being replaced by upwardly flowing cooler molten metal drawn along the floor of the tank structure, is counteracted by the effect of the linear induction motors 23 and 24 which break up any tendency for the cool molten metal to cause flows of molten metal spiralling down the bath which otherwise could be set up locally and could result in the undesirable local temperature gradients in the molten metal surface.

Figure 5:
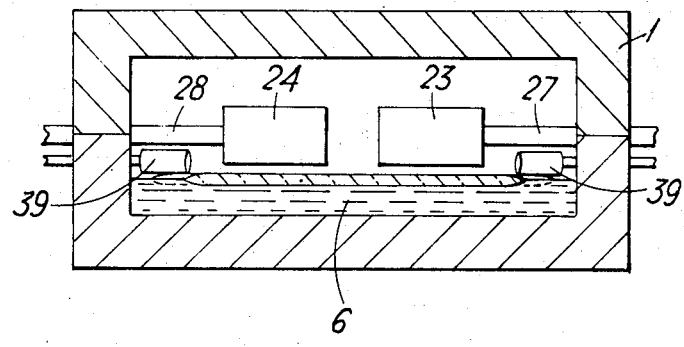
FIG. 5 is a section on line V—V of FIG. 4.
Figure 4:
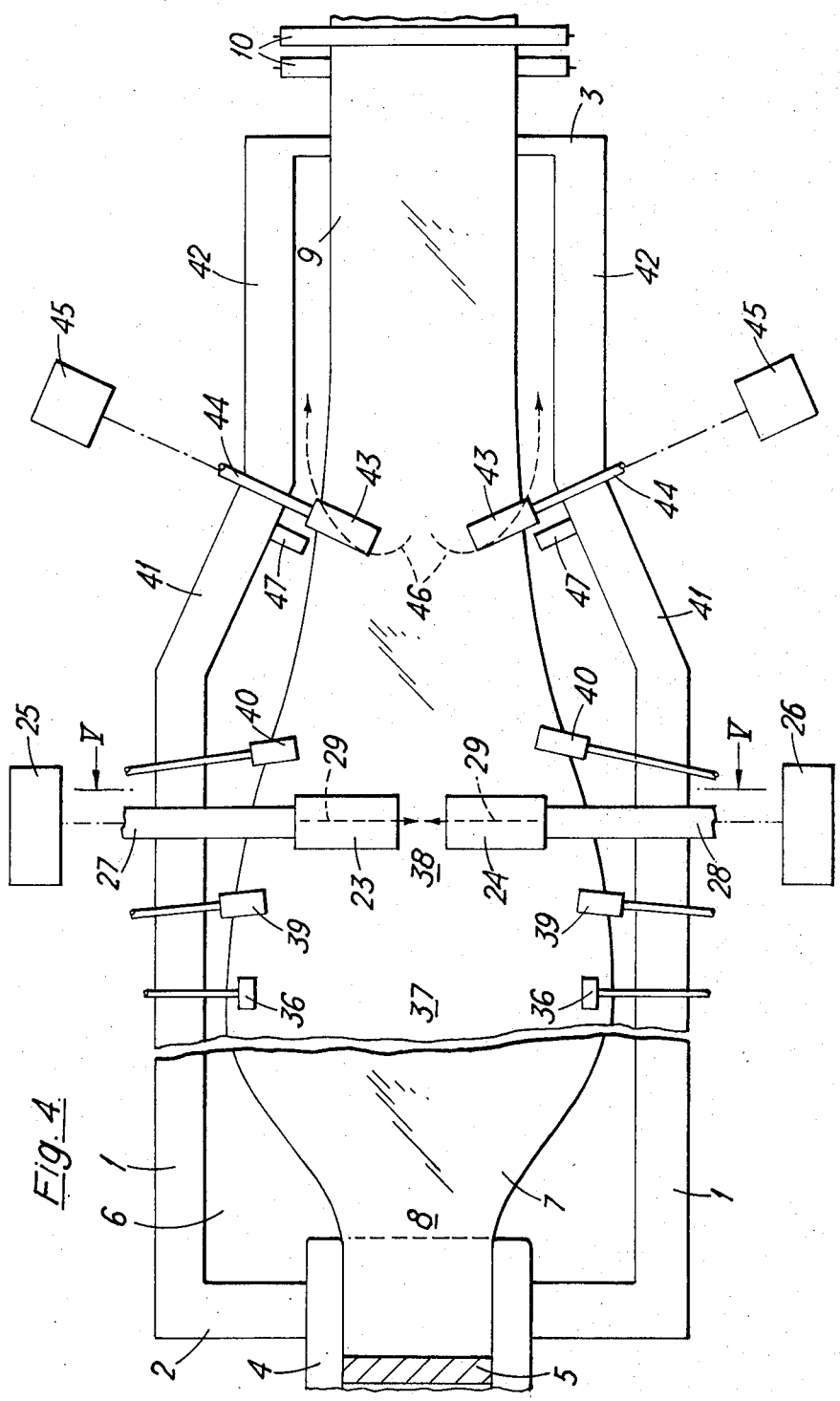
FIG. 4 is a view similar to FIG. 3, but showing a tank with a laterally constricted portion at the outlet end of the bath.

FIGS. 4 and 5 together illustrate a modification of the apparatus of FIG. 3. The side walls 1 of the tank structure are inclined inwardly near the outlet end to form shoulders 41 which connect the wider part of the tank to a laterally constricted part of the tank having side walls 42. The width of the tank structure at the inlet end is such as to accommodate the maximum possible spread of molten glass delivered at high load, and the narrowing of the tank structure at the outlet end brings the tank width to a dimension greater than the maximum width of the ultimate ribbon of thin glass 9 to be produced.

As the ribbon of glass approaches and passes between the shoulders 41 its speed is rapidly increasing up to the value which it reaches as the ribbon is passing along the laterally constricted part of the outlet end of the bath, with an even greater effect on the molten metal flows. The high speed of the thin ribbon of glass 9 being advanced along the narrow end of the tank, together with the effect of the shoulders 41 causes a pumping of molten metal towards the outlet end of the bath which molten metal is replaced by cool molten metal flow from the outlet end where the temperature is in the region of 650° to 700°C, towards the shoulders 41.

Further improvement in the process has been produced by providing two additional linear induction motors 43 mounted one on each of the shoulders 41 at the downstream ends of the shoulders where the shoulders join the side walls 42 of the narrower part of the tank. The linear induction motors 43 are short motors which extend inwardly just above the margins of the accelerating ribbon, and are mounted on the shoulders 41 on beams 44 carrying services from control means 45 in the same manner as for the motors 23 and 24.

The electrical control of the motors 43 is such as to cause molten metal flows indicated at 46 from the centre to the sides of the bath. Upstream of each of the motors there is a barrier wall 47 and these walls respectively project inwardly into the bath from the shoulders 41 and extend down through the whole depth of the bath so that the outwardly induced flows 46 of molten metal are diverted by the barrier walls 47 in the downstream direction, as indicated, into the narrow outlet end of the tank.

The control of the motors 43 is such that the influence of the motors extends deep into the molten metal of the bath thereby entraining flows of cool molten metal just above the floor of the tank and returning those flows to the narrower outlet end of the tank so that the cool molten metal from the outlet end does not flow into the reheat region of the tank where the glass is in the critical state during its attenuation.

Figure 6:
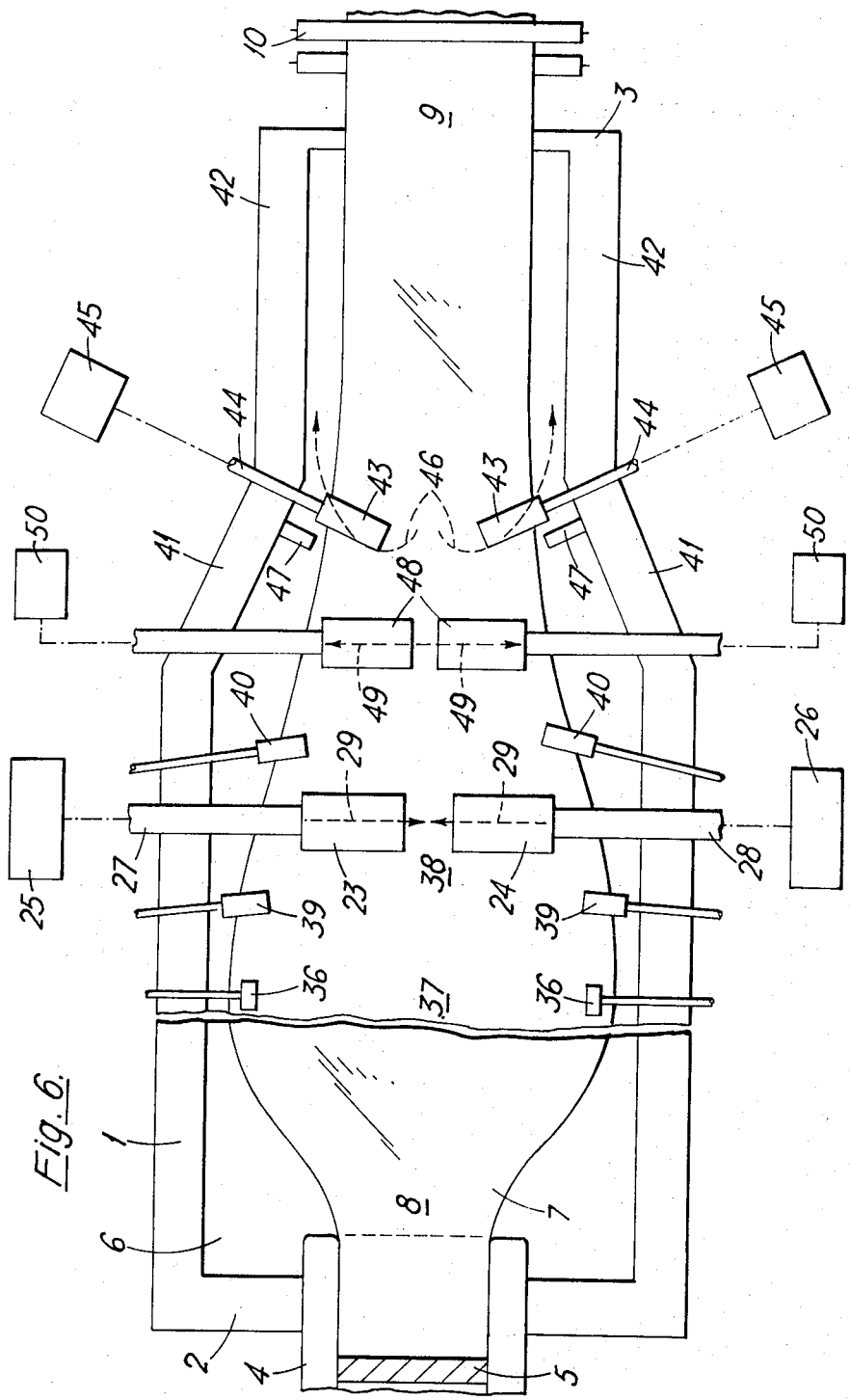
FIG. 6 illustrates a modified form of the apparatus of FIG. 4.

Even further refinement of the process is achieved by the arrangement illustrated in FIG. 6 in which a further pair of linear induction motors 48, similar to the motors 23 and 24, are mounted above the ribbon of glass downstream of the second pair of top edge rolls 40. The linear induction motors 48 are supplied with power from control means 50 in a sense such that the motors 48 induce outward flows 49 of molten metal from the center towards the sides of the bath; that is, in opposite direction to the flows 29 induced by the motors 23 and 24. The flows 49 outwardly must be thought of as co-operating both with the inward flows 29 and with the outward flows 46 to further avoid any instability in the process due to the production of localized temperature gradients in the downstream region of the reheat zone where the glass is rapidly accelerating and at the same time is beginning to cool to a temperature at which its viscosity is such that no further attenuation can take place.

By carefully setting the whole temperature regime down the bath from the inlet end to the outlet end as well as the rate of delivery of molten glass to the bath and the positions and speed of operation of the edge rollers 36 and the top rollers 39 and 40 as well as the setting and operation of the pairs of linear induction motors 23, 24, 43 and 48, the whole operation of the bath can be "tuned" in relation to the geometry of the bath so as to achieve stability of production at high speed of a ribbon of thin float glass for example 2 mm thick which is of a quality acceptable for lamination.

The direction of operation of all the linear induction motors can be varied to effect the best "tuning" of the process. In some circumstances, for example, the motors 23 and 24 may be operated to draw molten metal along the surface of the bath from the centre to the sides of the bath, and the motors 48 may also be reversed to provide side-to-centre flows.

By further increasing the speed at which the ribbon of glass is withdrawn from the bath for example up to 20 metres per minute even thinner glass can be produced, for example 1.7 mm or 1.5 mm thick. For the production of each thickness there was found to be a setting of the location and operation of the marginal rollers and of the linear motors to ensure that local temperature gradients existing in the molten metal supporting the glass where its viscosity is in the range of $10^{5.25}$ to $10^{6.75}$ poises and it is capable of being distorted, are smoothed out so that the ultimate ribbon of thin float glass produced has an underface with minimal surface distortion.

The method of the invention can also be applied to processes in which the initial ribbon of glass produced by the float process is gradually cooled but not as severely as in the method described above and is then conditioned without being marginally held, to a viscosity in the range $10^{5.25}$ to $10^{6.75}$ poises and is attenuated at that viscosity by applied tractive effort.

The method of the invention thus has utility in all developments of the float process where the ribbon accelerates as a result of longitudinal attenuation, particularly for the production of thin glass and in those methods provides improvements in the distortion characteristics of the underface of the glass. The method and apparatus of the invention extend the operation of the float process to the production of thin float glass of quality suitable for lamination and for all other uses in the automobile industry.

I claim:

1. In the method of manufacturing float glass in which glass in ribbon form is advanced along a bath of molten metal by tractive effort applied to the ribbon at the outlet end of the bath, and the glass passes along a zone of the bath in which its viscosity is controlled as the glass is attenuated at least in thickness, the improvement comprising generating mixing currents in said zone of the bath of molten metal in which the glass viscosity is controlled as the glass is attenuated so as to enhance thermal homogeneity in the molten metal of the bath at the glass/metal interface in said zone of the bath, while maintaining the viscosity of the glass in said zone in the range of $10^{5.25}$ to $10^{6.75}$ poises, to minimise local temperature gradients at the glass-supporting molten metal surface in that zone, thereby reducing bottom surface distortion in the attenuated ribbon to a minimum.

2. A method of manufacturing thin float glass comprising advancing glass in ribbon form along a bath of molten metal, applying tractive effort to the ribbon at the outlet end of the bath to advance the glass, holding the advancing glass to a viscosity in the range $10^{5.25}$ to $10^{6.75}$ poises as it passes along a zone of the bath in which zone the glass is attenuated to a desired thickness by said tractive effort, and generating mixing currents in said zone of the bath of molten metal in which the glass is attenuated so as to enhance thermal homogeneity in the molten metal at the glass/metal interface in that zone to combat random localised temperature gradients along the glass-supporting molten metal surface in that zone thereby minimising at least bottom surface distortion in the attenuated ribbon.

3. A method of manufacturing a float glass of thickness in the range 1.5 to 2.5 mm comprising pouring molten glass at a controlled rate on to a bath of molten metal to form a layer of molten glass on the bath, flowing the glass in the layer laterally unhindered to produce a buoyant body of molten glass, applying longitudinally directed tractive effort to the ultimate ribbon to advance the buoyant body along the bath in ribbon form, cooling the ribbon until it is sufficiently stiffened to be gripped; marginally gripping the stiffened ribbon to provide reaction to said tractive effect; reheating the advancing stiffened glass to a viscosity in the range $10^{5.25}$ to $10^{6.75}$ poises as it passes along a glass attenuation zone of said bath to condition the glass for thickness attenuation in said zone by said tractive effort, subjecting the reheated glass to a temperature gradient which sets the accelerating glass at a desired thickness, and generating mixing currents in said attenuation zone of said bath so as to enhance thermal homogeneity in the molten metal of the bath in the attenuation zone to minimise at least bottom surface distortion thermally induced in the glass by local temperature gradients while the glass is at a viscosity in said zone at which the glass is susceptible to distortion.

4. A method according to claim 1, wherein said currents are created by electromagnetically inducing transverse surface flows of molten metal across the bath in said zone.

5. A method according to claim 3, in which lateral flows of molten metal are created across the bath in a region downstream of said zone in which the glass is attenuated to divert in a downstream direction upstream flows of cool molten metal from an outlet end of the bath.

6. A method according to claim 5, in which the attenuated ribbon of desired thickness is advanced along a laterally constricted region of the bath as it is cooled prior to discharge from the bath, and said lateral flows of molten metal are created across the bath in the region where the bath narrows, to divert into said laterally constricted region upstream flow of cool molten metal from the outlet end of the bath.

7. Apparatus for manufacturing float glass comprising an elongated tank structure containing a bath of molten metal, means for delivering glass to the bath at a controlled rate and advancing the glass in ribbon form, thermal regulator means for holding the advancing ribbon to a viscosity in the range $10^{5.25}$ to $10^{6.75}$ poises in a thickness attenuation zone of said bath, means for applying traction to the ultimate ribbon so that the glass at said viscosity is attenuated in said attenuation zone to a desired thickness, electromagnetic means mounted in the tank structure at a position over the ribbon of glass in said attenuation zone where the glass is in said viscosity range, which electromagnetic means are positioned tranversely of the bath, and means for controlling said electromagnetic means to generate mixing currents in said attenuation zone so as to enhance thermal homogeneity of the molten metal of the bath in that zone, the outlet end of the tank structure being laterally constricted to a width just greater than the width of the ultimate ribbon, and inclined shoulders being formed in the side walls of the tank, said shoulders connecting the oulet end of the tank to the wider part of the tank, two linear induction motors, in addition to said electromagnetic means, being mounted, one each, on one of said shoulders so as to be directed at an angle upstream of the bath, two barrier walls respectively projecting inwardly into the bath from the shoulders just upstream of each of said linear induction motors and means for controlling said motors to cause molten metal flows from the center to the sides of the bath in the region of the shoulders, which flows are returned into the outlet end of the tank by the barrier walls.

8. Apparatus according to claim 7 including a first pair of marginal edge rolls cooling means for stiffening the ribbon to enable it to be engaged by said first pair of marginal rolls providing a reaction to said applied traction, said thermal regulator means being positioned to reheat the glass in said attenuation zone to a viscosity in said range after marginal engagement, and said apparatus further including at least two further pairs of edge rolls downstream of said first pair of rolls, to apply width-maintaining forces to the glass as it is being attenuated, said electromagnetic means being mounted between said at least two further pairs of edge rolls.

9. Apparatus according to claim 7, wherein the electromagnetic means are linear induction motors.

10. Apparatus according to claim 7, comprising a further pair of linear induction motors mounted in the tank structure over the glass just upstream of the shoulders, and means for controlling this further pair of motors to cause molten metal flow from the center to the sides of the bath.

* * * * *

UNITED STATES PATENT OFFICE
CERTIFICATE OF CORRECTION

Patent No. 3,771,985      Dated November 13, 1973

Inventor(s) George Alfred Dickinson

It is certified that error appears in the above-identified patent and that said Letters Patent are hereby corrected as shown below:

Add to title page, line 30 "Foreign Application Priority Data, June 4, 1970    Great Britain, 27039/70".

Signed and sealed this 11th day of June 1974.

(SEAL)
Attest:

EDWARD M. FLETCHER, JR.
Attesting Officer

C. MARSHALL DANN
Commissioner of Patents